United States Patent [19]

Mufti et al.

[11] Patent Number: 5,363,425
[45] Date of Patent: Nov. 8, 1994

[54] METHOD AND APPARATUS FOR PROVIDING A PERSONAL LOCATOR, ACCESS CONTROL AND ASSET TRACKING SERVICE USING AN IN-BUILDING TELEPHONE NETWORK

[75] Inventors: Sohale A. Mufti, Kanata; Robert G. Samuel; Peter P. K. Soong, both of Nepean; Adrian M.-G. Yip, Kanata; Michael J. Wakim, Nepean, all of Canada

[73] Assignee: Northern Telecom Limited, Quebec, Canada

[21] Appl. No.: 906,192

[22] Filed: Jun. 29, 1992

[51] Int. Cl.⁵ .......................................... H04M 11/00
[52] U.S. Cl. .................................. 379/38; 379/201; 379/211; 340/825.49; 340/825.54
[58] Field of Search ................ 379/59, 60, 56, 90, 379/93, 38, 201, 210, 211, 196; 340/522, 571–573, 825.44, 825.49, 825.54, 825.55; 455/56.1, 33.3

[56] References Cited

U.S. PATENT DOCUMENTS

| 4,510,495 | 4/1985 | Sigrimis et al. | 340/825.54 |
| 4,601,064 | 7/1986 | Shipley | 379/211 |
| 4,649,385 | 3/1987 | Aires et al. | 379/210 |
| 4,752,951 | 6/1988 | Konneker | 340/825.49 |
| 4,813,065 | 3/1989 | Segala | 379/114 |
| 4,837,568 | 6/1989 | Snaper | 340/825.49 |
| 4,990,892 | 2/1991 | Guest et al. | 340/825.49 |
| 5,028,918 | 7/1991 | Giles et al. | 340/825.54 |
| 5,142,654 | 8/1992 | Sonberg et al. | 379/59 |
| 5,197,092 | 3/1993 | Bamburak | 379/211 |

FOREIGN PATENT DOCUMENTS

| 62-195940 | 8/1987 | Japan . | |
| 8904031 | 5/1989 | WIPO | 340/522 |

OTHER PUBLICATIONS

"Straw man for automatic roaming electronic industries association TR-45.2 cellular system operation", Jun. 8, 1985.

Primary Examiner—Wing F. Chan
Attorney, Agent, or Firm—Jean-Pierre Fortin

[57] ABSTRACT

A system for providing a personal location, access control and asset tracking service using an in-building telephone network is disclosed. In a first embodiment, users of ID badges containing an RF transmitter can be located across the telephone network for receiving incoming calls. Receiver units in or near telephone sets instruct the system of the identity of the user located near the telephone set. In another embodiment, access to a building or rooms therein is controlled according to the identity of the ID badge wearer. Similar receiver units located at building and room entrances receive the RF transmission from the ID badge to allow or deny access to the rooms or building. In a third embodiment, ID tags placed on material assets permit the system user to monitor the movement and location of specific material assets associated with that ID tag. The ID tag also contains an RF transmitter which is used to transmit an RF burst to receiver units located across the telephone network.

21 Claims, 6 Drawing Sheets

METHOD AND APPARATUS FOR PROVIDING A PERSONAL LOCATOR, ACCESS CONTROL AND ASSET TRACKING SERVICE USING AN IN-BUILDING TELEPHONE NETWORK

FIELD OF THE INVENTION

This invention relates to personal communication services and more particularly to systems for providing a locator, access control and asset tracking service whereby users and material assets can be located and access restricted using an in-building telephone network.

BACKGROUND OF THE INVENTION

A number of personal communication devices have been designed to allow subscribers of the telephone service the opportunity to be reached in the event a calling party is attempting to reach that subscriber. Portable cellular telephones, pagers and cordless telephones are such known devices.

Those who do not have access to these devices can currently receive calls at a telephone set other than their own, by providing potential callers their new telephone numbers, call forwarding their calls to a telephone set at their new location, or specifically instructing the network of their new location each time they move to a new location.

Similarly, a number of asset tracking systems have been designed to provide a user assistance in tracking material assets. One of the problems associated with the tracking of assets, is that the equipment is often moved from one room to the next as the need arises. Thus, the tracking of expensive equipment within, say, a large laboratory, can be difficult. In addition, a material asset could be removed from the secured premises without detection.

One of the problems associated with the existing locator and asset tracking systems, is that they require the site to be re-wired for installation of infrared or other sensors, which is often done at the expense of the user. Systems that are designed for locating individuals for the routing of calls, are not useable as an asset tracking system and vice versa.

Although some systems provide transmitting devices to be carried by individuals, the user has no control over its use. That is, other than leaving the transmitting device at a specific location, calls will always follow the individual. This can be annoying, especially, if the individual does not want to be disturbed at his or her new location. For example, the individual maybe in a meeting, with others, also wearing the transmitting device.

Another problem is that the ID code sent by the transmitting device is not secure and can easily be replicated.

Yet another problem associated with the use of existing systems, is when the individual is located in an area served by multiple telephone terminals. A number of operational and network oriented problems will occur, since several telephone terminals will pick up the same ID code. In addition, in some instances, the terminal picking up the strongest signal from the ID transmitting device will not necessarily be the unit closest to the individual, therefore resulting in confusion.

Systems that offer access control currently do not make use of the in-building telephone system to restrict access either into the building or to specific rooms once inside the building.

Thus a need exist for a personal communication system able to automatically locate a user for the purpose of delivering an incoming call to them, which can be used for in-building access control and which can also be used to locate assets in real-time to eliminate physical inventories and loss of valuable assets.

Accordingly, there is a need for an improved method and apparatus for providing a locator, access control and asset tracking service whereby users and material assets can be located using an in-building telephone network, while also providing intelligent network services.

It is therefore an object of the present invention to provide an improved method and apparatus for operating a personal communication and locator service within a telephone network wherein a transmitting device is provided having means to enable the user to either become automatically or manually registered with the telephone network.

Another object of the present invention is to provide an improved method and apparatus for operating a personal communication and locator service within a telephone network, wherein the transmitting device enables the downloading of the user's service configuration to a specific telephone set.

Another object of the present invention is to provide an improved method and apparatus for operating a personal communication and locator service within a telephone network, wherein the transmitting device allows the user to activate and deactivate intelligent network services without having to make use the keypad on the telephone terminal located nearby.

Another object of the present invention is to provide an improved method and apparatus for operating a personal communication and locator service within a telephone network, wherein access control is provided by making use of the transmitting device to allow the user to enter and exit a facility or room according to the entry level requirements.

Another object of the present invention is to provide an improved method and apparatus for operating a personal communication and locator service within a telephone network, wherein the transmitting device is in the form of an ID badge which can either transmit an autonomous periodic RF signal to a receiving unit located at a nearby telephone terminal or transmit a different RF signal when one or more buttons are depressed.

Another object of the present invention is to provide an improved method and apparatus for operating an asset tracking service using the in-building telephone network.

Another object of the present invention is to provide improved method and apparatus for operating an asset tracking service, wherein a transmitting device is permanently secured to an asset to enable a receiving station, connected to the telephone network, to monitor the location and movement of the asset.

Another object of the present invention is to provide improved method and apparatus for operating an asset tracking service, wherein the transmitting device is provided with means for detecting the removal of the transmitting device from the asset.

SUMMARY OF THE INVENTION

In the first embodiment of the invention, a low-power signal is emitted by a small radio transmitter embedded in a person's identification badge. The transmitter automatically sends out signals, which the system uses to update the person's location. Alternately, the user can manually register his or her new location by pushing a button on the ID badge. This signal is detected by base stations, typically located within the walls of a building or in desktop telephone sets. Upon receiving a signal, the base station communicates over the telephone lines with a telecommunications switch. The switch contains software to locate individuals and redirect their phone calls to the nearest telephone.

The software in the telecommunications switch also enables features that give individuals extensive ability to customize their personal communications to suit individual needs and preferences. For example, an individual can request that the system screens incoming calls, so that only high priority callers are put through. Other calls could be directed to voice mail.

In addition, the individual can also conveniently control the extent to which his or her personal communications services are transferred to a telephone at a new location. A user might want to have only external calls forwarded, or temporarily assign to the nearest phone, all of his or her personal telephony services, such as a speed-dialling directory and called-number display.

Also, the ID badge is designed to restrict or allow access to certain areas of a building, or the building itself.

In a second embodiment of the invention, the system keeps track of the location of critical assets, such as computerized workstations or test equipment. Tags, containing the low-power transmitters are placed on, or inside, the assets. These transmitters emit a signal at designated intervals. If the asset is moved, the signal is detected by the base stations, located within the walls of the building or in desktop telephone sets, pinpoints the new location and sends this information over the telephone lines to a database.

The actual network communication can be accomplished through the use of signal modulation such as the "data above voice" mechanism, or through the use of the "D channel" signalling as defined in the Integrated Services Digital Network (ISDN) Basic Rate Interface (BRI) Q.931 signaling.

The transmitting devices send periodic homing signals to a receiving device located nearby. The information which is sent identifies the badge and any miscellaneous operations associated with the operation of the badge. In the case of asset tracking, the homing signal provides an indication of the type of asset being tracked by the system.

Accordingly, a first aspect of the present invention is to a system for providing a personal communication locator service within a telephone network, comprising:
transmitter means adapted to be carried by a user, and able to transmit a predetermined RF signal, said transmitter means having input means to allow said user to modify said predetermined RF signal to initiate a specific network service;
multiple receiver means adapted to be connected to said telephone network and able to receive said predetermined and modified RF signals indicative of a specific network service requested by said user;
signal modulation means for modulating said predetermined and modified RF signals into a modulated signal; and
database means associated with said telephone network adapted to receive and process said modulated signal to enable said user to receive incoming calls and make use of the requested service at a telephone terminal associated with said receiver means.

According to a second aspect of the present invention there is provided an asset tracking system for use with a telephone network, comprising:
a tag adapted to be secured to a tracking asset;
sensing means on said tag for detecting removal of said tag from said asset;
transmitter means built into said tag and adapted to transmit a predetermined RF signal indicative of the description of said asset, said transmitter means being adapted to transmit a modified RF signal when said sensing means detects the removal of said tag from said asset;
multiple receiver means adapted to be connected to said telephone network and able to receive said predetermined and modified RF signals;
modulating means for modulating said predetermined and modified RF signals into a modulated signal for transmission on said telephone network, said modulated signal providing an indication of the location and identity of an asset associated with said tag; and
database means associated with said telephone network and adapted to receive and process said modulated signal to enable the identification and tracking of said target with respect to said multiple receiver means.

DETAILED DESCRIPTION OF THE DRAWINGS

Figure 1:
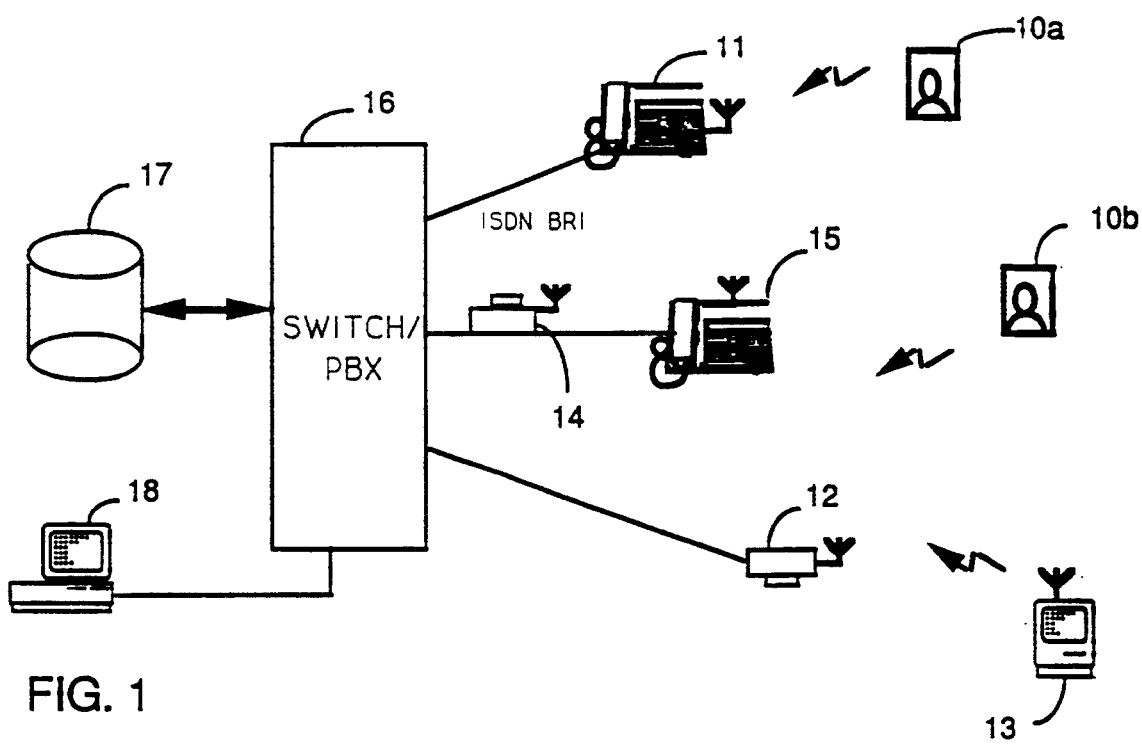
FIG. 1 is a block diagram illustrating a system for providing a locator and asset tracking service according to an embodiment of the invention.

Referring now to FIG. 1, we have shown a diagram illustrating how the personal communication locator and asset tracking service interacts with a telephone network. In particular, in one embodiment of the invention, the service makes use of a transmitting device forming an integral part of an ID badge 10a and 10b and a receiving device located either at a telephone terminal 11 or as part of an stand-alone unit 12 to provide a personal communication service. In a second embodiment of the invention, the transmitting device can form part of an asset tracking tag attached or secured to a material asset, such as a computer 13 or other piece of equipment. A receiving device 14 can also be designed such that it can be connected between a telephone terminal 15 and a switch or PBX unit 16. Power to the receiving device 14 is provided by the switch 16, via the telephone line. This provides a centralized battery backup, reduces the cost of installation and also reduces the complexity of the system, since the units do not have to be placed near electrical outlets. As will be shown in FIGS. 2a, 2b, 3a and 3b, the receiving unit can be positioned in a number of areas of a building to provide the locator, asset tracking and access control services defined herein.

A database 17 associated with the telephone network records all data associated with the RF signal sent by the transmitting device via the RF signal receiving device attached to the telephone network. This recorded data will form the information database through which Personal Communications Services (PCS) can be realized. A workstation 18, such as a PC, can be used for accessing the database 17 for reading the information stored therein. Similarly, the PC can also be used to directly store the information received from the switch or PBX unit 16. Similarly, the workstation can continuously monitor movement of tags, in the case of asset tracking, wherein the PC would initiate a security sequence, such as alerting a security guard, if the asset is moved away from its assigned area.

Access Control System

Figure 2A:
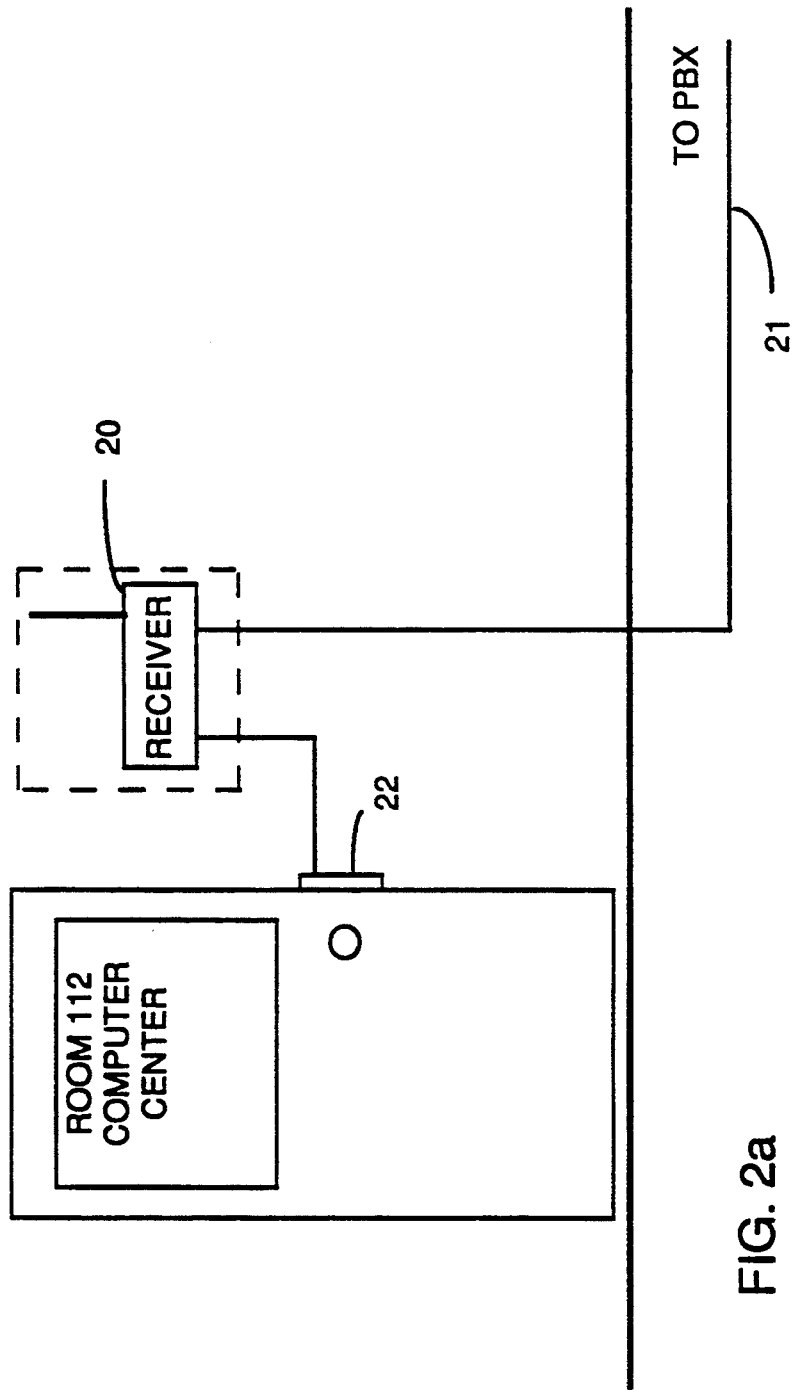
FIG. 2a is an illustration of a possible mounting arrangement for an access control receiver according to a first embodiment of the invention.
Figure 2B:
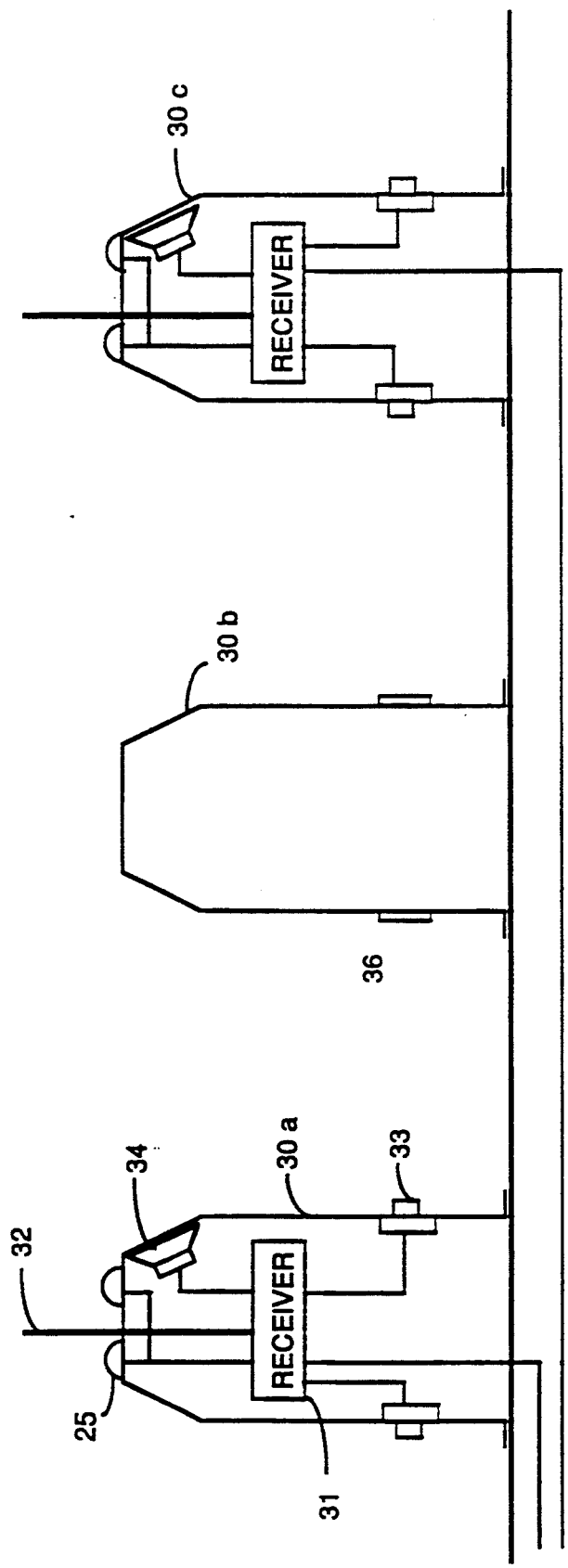
FIG. 2b is an illustration of a possible mounting arrangement for an access control receiver according to a second embodiment of the invention.

In one embodiment of the present invention, building entry and access control can be provided. In this application, the RF signal receivers can be located on the ceiling, or in the walls of a building, as shown in FIGS. 2a and 2b, to control the access to a room or building. For example, as shown in FIG. 2a, receiver 20 is connected to a PBX (not shown) via an ISDN BRI link 21 or equivalent. In the embodiment shown, the receiver is also connected to a door latch 22 to allow or deny access of personnel to the computer room. Thus, only those employees that have an ID badge emitting the correct RF pattern will be allowed in the room.

In another application, a base station can be installed at a building entrance by mounting a receiving unit inside a passageway pedestal, as is shown in FIG. 2b. The diagram shows the view of the pedestals 30a, 30b and 30c as would be seen by a user entering the building. At pedestal 30a, a receiver 31 mounted inside the pedestal is connected to an antenna 32. Receiver 31 is connected to front and back photoelectric sensors 33, loudspeaker 34 and alarm lamp 35. The base station receiver 31 monitor the photoelectric sensors 33 in order to distinguish incoming and outgoing traffic. In FIG. 2b, only one sensor is shown for clarity. Front and back sensors would be positioned horizontally adjacent one another to identify movement of users. The base stations can be isolated by a dummy pedestal 30b, in order to allow use of multiple pedestals at the same entrance. Each dummy pedestal is provided with reflectors 36 positioned opposite sensors 33.

In this embodiment, the base station is a stand alone unit. The receiver 21 receives a radio message from the user's badge and grants access to the user by matching the ID code of the user's badge to the user's service address in an internal database located on site or on the network database. If the user is valid, a green lamp lights on, and the sensors are bypassed until the user walks by.

If the badge is invalid, or the user walks through without pressing the button on the badge, a red lamp will flash, and an alarm will sound via the loudspeaker 24. The loudspeaker is able to produce different alarm sounds to indicate different situations. The base station transmits a radio message which may be used at an alarm indicator box at the guard's desk.

In the case of visiting employees from other sites, as the visitor enters the building, the base station will access the corporate database. If the user is valid, the receiver will add the user to the visiting employee database, for use by sensors of other entrances as well.

Asset Tracking System

Figure 3A:
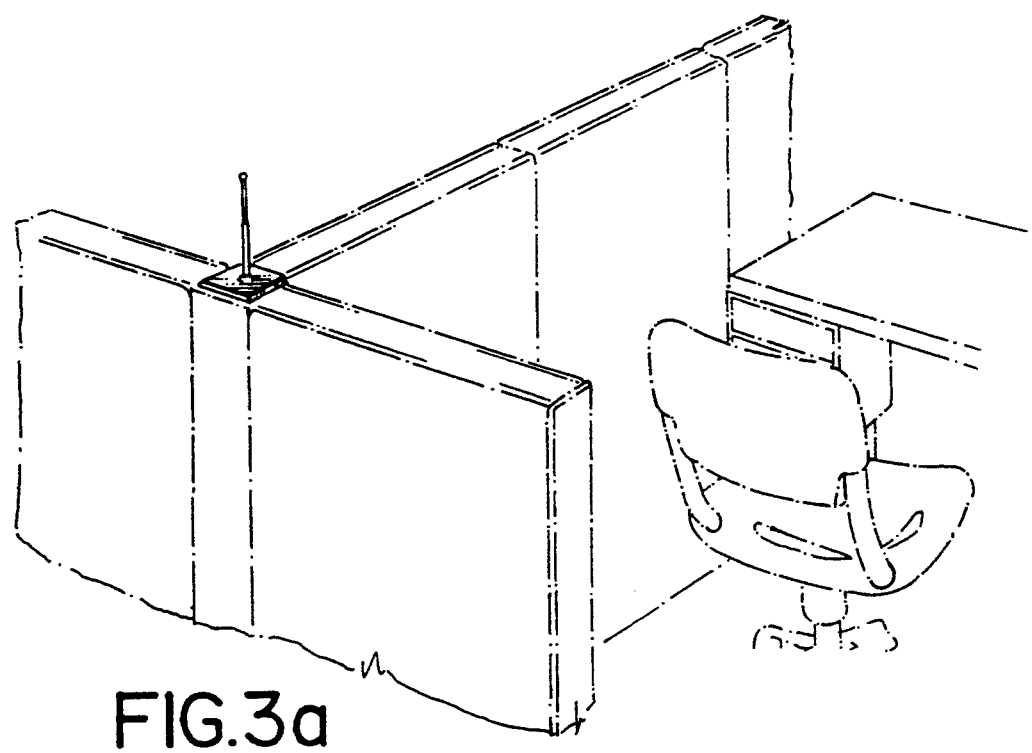
FIGS. 3a and 3b are illustrations of a possible mounting arrangement for a locator/asset tracking receiver according to another embodiment of the invention.
Figure 3B:
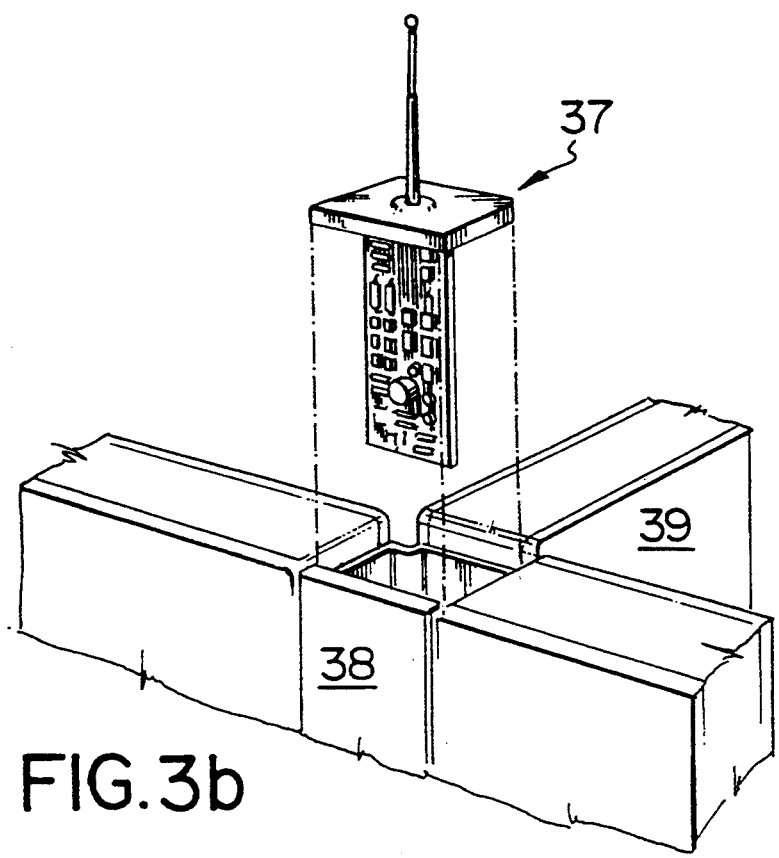

When used for asset tracking, the system makes use of small tags which are attached on the interior or exterior of a material asset. Receiver units, distributed within the facilities, monitor the RF bursts from the ID tags. For example, at entrances and exits of the building or rooms therein, such as shown in FIGS. 2a and 2b, or in standard office partitions, such as shown in FIGS. 3a. In the illustration of FIG. 3b, a receiver unit 37 is located at a corner junction 38 of the partition's walls 39. The receiver unit 37 is connected via a standard telephone line (not shown) to the switch or PBX unit. With this arrangement, the receiving unit can be used for both the asset tracking and personal locator services.

Figure 4A:
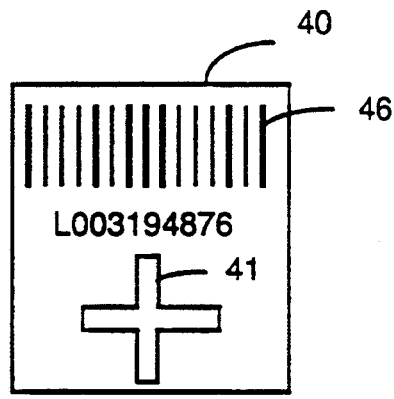
FIGS. 4a, 4b and 4c are top, bottom and side views, respectively, of a typical asset tracking tag according to an embodiment of the invention.
Figure 4B:
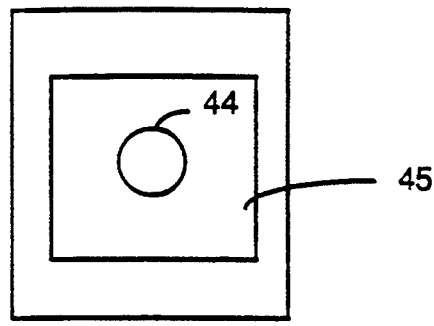
Figure 4C:
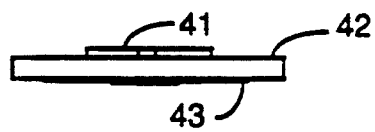

One embodiment of the asset tag is as shown in FIG. 4a, 4b and 4c. The tag 40 is designed to be small in size to be unobtrusive. It is provided with an antenna 41 which is slightly raised above the top surface 42 of the tag for assets that have a metallic surface. The antenna is generally cross-shaped to permit an omnidirectional radiation pattern and provide spatial diversity which enhances the transmission reliability and range of the tag. In the embodiment shown, the bottom side of the tag 43 is provided with a sensor 44 surrounded by an adhesive surface 45. Sensor 44 is designed to detect the removal of the tag from the surface of an asset. For example, the sensor can be integrally formed with a permanent adhesive pad, such that any attempt to remove the tag, will destroy the adhesive pad and disconnect the sensor from the transmitter. It will of course be known to those knowledgeable in this art, that other sensor designs can be derived without departing from the scope of the invention. The surface 42 of the tag can be provided with a bar type code 46 to assist in the programming and identification of tags prior to being placed on the asset.

Figure 5:
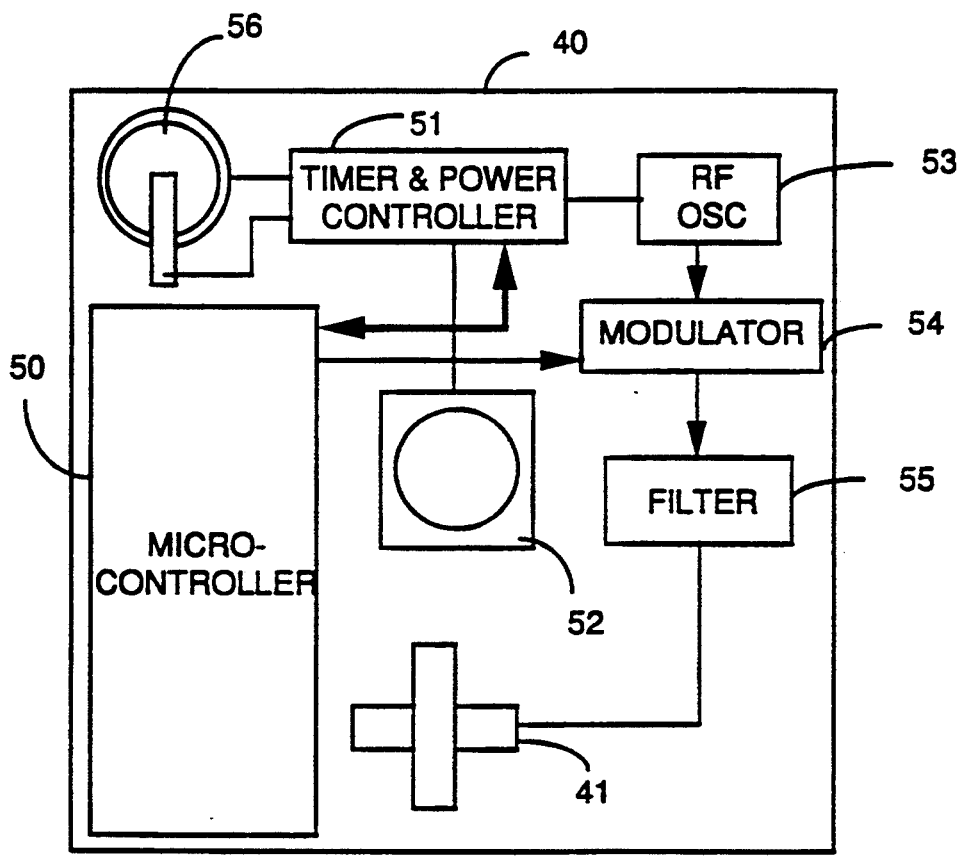
FIG. 5 is a block diagram showing the general layout of the asset tracking tag of FIG. 4.

If we now refer to FIG. 5, we have shown a block diagram describing the layout of the transmitter in the asset tag. The transmitter is basically comprised of a microcontroller 50, a timer and power controller circuit 51 for power control and sensor registration detection. A sensor button 52 is connected to the controller 51 for detecting the removal of the asset tag. An RF oscillator 53 is used in conjunction with a modulator 54 and filter 55 for transmission of signal bursts to a receiver (not shown) via antenna 41. A battery 56 provides the necessary power to the transmitter circuit. The transmitter's microcontroller will monitor the sensor button status, check for low battery, send a burst signal for modulation by the modulator 54. The burst signal, as will be shown below, comprises a tag ID number, battery status, sensor button state and CRC.

Personal Locator System

Figure 6:
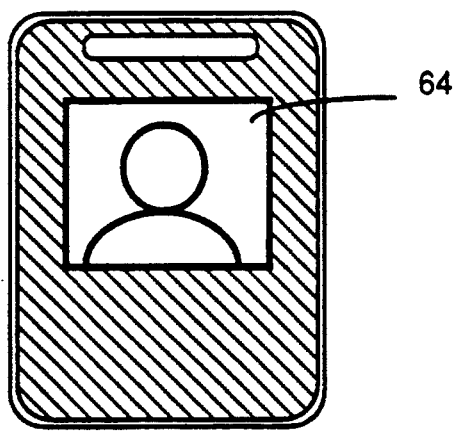
FIGS. 6a and 6b are top and bottom views, respectively, of a typical locator ID badge according to an embodiment of the invention.
Figure 6:
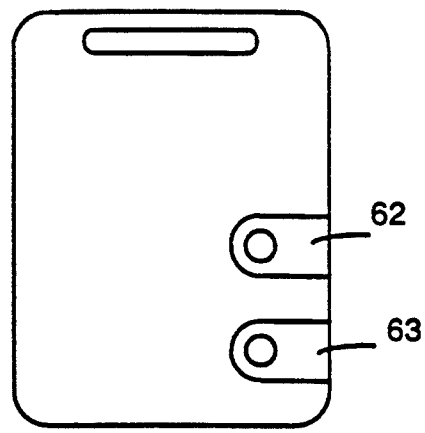
Figure 7:
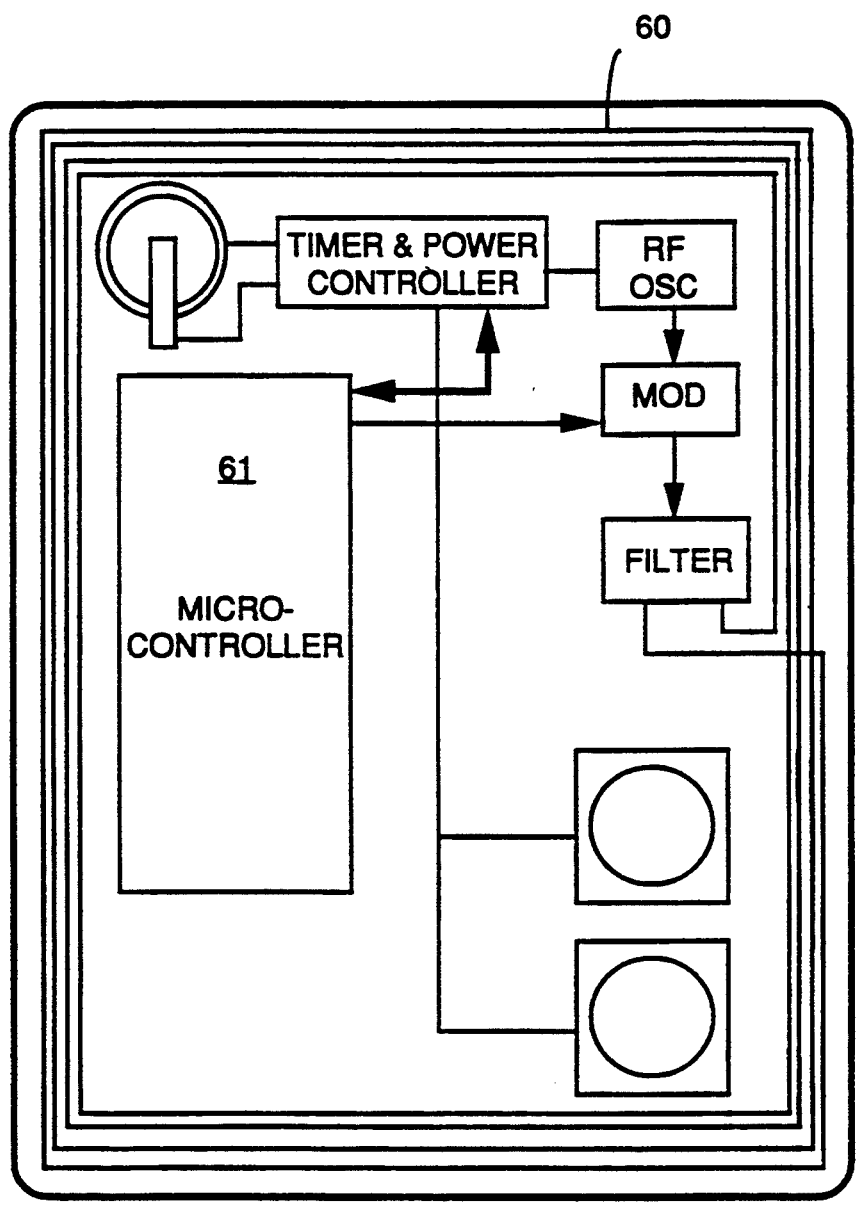
FIG. 7 is a block diagram showing the general layout of the locator ID badge of FIG. 6.

In FIG. 6a and 6b, we have shown a top and bottom view of a user ID badge for use with the access control or personal locator systems. The top view shows that the badge can look like any other ordinary badge. However, as seen in FIG. 6b, the badge can be comprised of two (2) programmable input buttons to allow a user to request specific personal communication and network services, as will be described below. The transmitter layout of the badge shown in FIG. 7, is similar to that of the asset tag. The badge, however, can also make use of an etched antenna 60 which spirals around the perimeter of the badge to make it both compact and omnidirectional. The transmitter of the badge operates similarly to the one in the asset tag, except that the microcontroller 61 is provided with additional software to allow user access to the services described below. The ID badge shown in FIG. 6a and 6b, can also be designed such that the control and registration buttons 62 and 63 are positioned on the same side as the photograph 64 of the badge.

Receiver Unit

Figure 8:
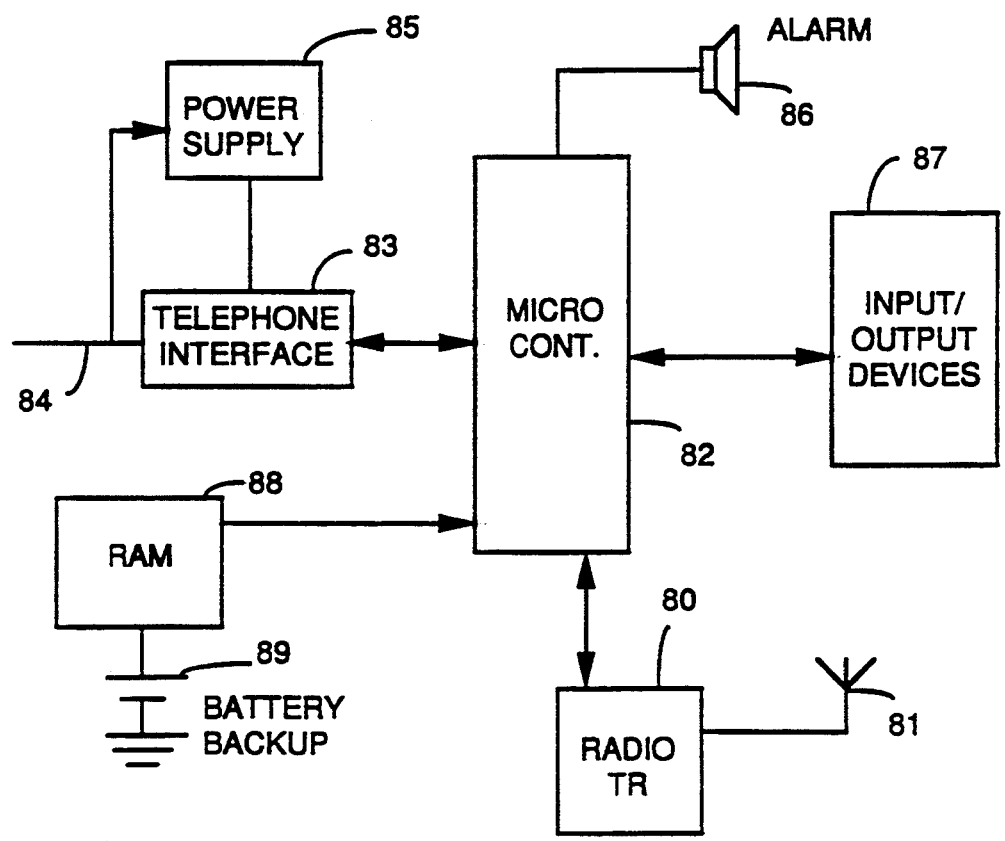
FIG. 8 is a block diagram of a locator/tracking receiver according to an embodiment of the invention.

A block diagram of a receiver unit for use with the embodiments of FIGS. 2a, 2b, 3a and 3b is shown in FIG. 8. The receiving unit is basically comprised of a transceiver 80 connected to an antenna 81 and a microcontroller 82. The microcontroller 82 communicates with a telephone interface 83 in order to communicate with the telephone network. The telephone interface 83, is used to modulate a received RF signal from an ID badge or asset tag, for transmission to the switch 16 and database 17. The link 84 is accomplished using an ISDN BRI link or equivalent. Power is provided to the power supply 85 from the telephone line. When the receiving unit is used as part of a pedestal entry system, an alarm speaker 86 is provided. A number of input/output devices 87, such as a door latch, lamp or LED, photocell, switches, etc. can be controlled by the micro controller 82. These input/output devices will vary according to the location and use of the receiving unit. A RAM 88 with battery backup 89 is provided for storing ID codes and firmware. The RAM battery backup 89 allows both user database and firmware to be preserved during a power failure.

Radio Link

The radio link between a transmitting device of an ID badge or asset tag and the receiving devices is normally unidirectional. However, the tags and badges can be designed to react to certain prompts from the system, as in the case of an emergency or to request immediate identification of the ID badge user or asset tag. For example, the asset tag can be designed to send out its ID code upon crossing and sensing a low power electric or magnetic field near a doorway, thus enabling the asset tracking system to monitor the movement of the asset. Similarly, the ID badge could send out the user's ID code upon passing near a receiver unit at a telephone, office partition, doorway or building entrance, enabling the personal locator system to locate the user.

Figure 9:
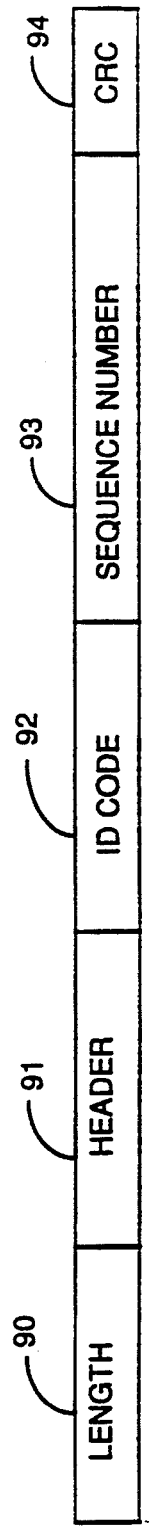
FIG. 9 is an illustration of a typical transmission burst from a transmitting device.

The system is designed such that at random intervals, the transmitter sends out an RF burst of information having a basic structure. For example, as shown in FIG. 9, the radio burst can start with a 3 byte preamble 90, used for synchronization, followed by 10 bytes of data, including a header 91, an ID code 92, a Sequence Number 93 and CRC 94. The Length field 90 specifies the length of the packet (in bytes) excluding the length field itself. The length field can vary between 3 and 15 bits. The header byte allows for up to 256 message types. In the case of the ID badge, the ID code can be used to store a 7 digit (decimal) employee number (3 bytes) along with one byte company affiliation or location code. The telephone switch would map this number to a home telephone set used by the user. In the case of the asset tag, the ID code would be the asset's unique number.

In order to reduce the possibility of fraud on the system, the transmitter units in the asset tags and ID badges make use of a counter increase the sequence number by one each time the tag or ID badge sends out a new burst.

The following messages have been defined in the preferred embodiment of the invention. The TAG messages apply to the asset-tags only.

| Hex | Message Type | Description |
| --- | --- | --- |
| 00 | BADGE_LOCATION | Sent at regular intervals during Autonomous Mode |
| 01 | BADGE_S1 | Sent when the top button on the badge is pressed |
| 02 | BADGE_S2 | Sent when the bottom button on the badge is pressed |
| 03 | BADGE_DISTRESS | |
| 04 | BADGE_DEFECT | Sent at regular intervals when a badge has determined an internal malfunction |
| 05 | BADGE_LOW_BAT | Sent at regular intervals when the battery is low |
| 06 | | |
| 07 | TAG_LOW_BAT | Sent at regular intervals when the battery is low |
| 08 | TAG_LOCATION | Sent at regular intervals when a tag is affixed to an asset |
| 09 | TAG_DISTRESS | Sent at regular intervals when a tag has been removed from an asset |
| 0A | CONFIG_START | Programmer use only: Indicates beginning of configuration mode |
| 0B | CONFIG_END | Programmer use only: Indicates end of configuration mode |
| 0C | spare | |
| 0D | spare | |
| 0E | spare | |
| 0F | DIAGNOSTICS | Programmer use only: Various functions |

Before the burst is sent, the burst is scrambled. This is performed over the entire message including CRC, excluding the length field. It is used to reduce the possibility of sequential zeros which can degrade the reception quality at the base station.

The CRC bits are used to validate the burst and protect against collisions with competing transmitters.

During normal operation, the receiver will decode and validate incoming bursts from nearby ID badges and asset tags. This involves detecting the start of the burst, compensating for any DC offset in the incoming analog signals, performing Automatic Gain Control (AGC), by selecting the correct A-to-D input, clock recovery, removal of balance bits and CRC bits validation. The receiver will also keep a list of all ID badges and assets within range, including the filtering of spurious signals from other ID badges and asset tags. This can occur when, for example, ID codes from multiple badges and/or asset tags collide or are corrupted. The receiver will then send the ID's, with encrypted burst counters, and signal strengths to the telephone switch and report registration of ID badges, tag tampering and which ID badges and asset exit a receiver's operating area.

Personal Locator Service

The personal communication locator system can provide a number of PCS telephony features and services when a user makes use of the control buttons 62 and 63 (FIG. 6b) on the ID badge. In the preferred embodiment, three operational states can exist:

Located: The telephone network knows the location of the user. This can be achieved by an autonomous periodic RF signal transmitted from the ID badge's transmitter.

Registered: The telephone network is granted permission by the user to act upon the knowledge of the user's location. The registration can be established through the use of a button depression on the ID badge. By pressing this button, a modified RF signal is transmitted, thus enabling the user to register in the network.

Logon: Transfers the user's service configuration to a specific telephone set that the user wish to "log" on. The actual logon procedure can be realized through the use of one or both buttons, depressed simultaneously or in sequence.

The Located state is activated as soon as the user's ID badge sends out a signal and the signal is picked up by a network receiver. This state can be used in emergency situations to get a call to the user.

Inbound PCS can be accomplished through the use of Registered state, in this state all calls to the user are automatically redirected to the phone on which the user has registered. Registration can occur by pushing a button on the locator tag, using display with softkeys technology on telephone sets, using voice response units, or using voice recognition techniques. For example, as shown in FIG. 1, if user A of badge 10a has telephone 11 for a home set, i.e. the user's usual telephone set, then being Located at that set will cause automatic registration. For example, when the user walks back to his office after visiting a colleague on another floor.

When a call arrives for a user, the network verifies whether the user has subscribed to the PCS service. A database query will be performed, and the user's new location information will be returned to the switch for proper routing. Call Screening can be accomplished as the user's screening data will be embedded in the database, as screening is applied, new routing info will be returned to the switch. The switch can then reroute the call to the appropriate destination as specified by the user.

The Logon state allows for outbound PCS functionality where the user's profile is placed against the telephone set the user has logged onto. This allows the user to obtain their services at the logged on set, have their name and number send out with each call, and have calls placed from that set billed to the logged on user. For example, as in the above example, if user A happens to be using the office where telephone set 15 is located, user A can "logon" or "register" his profile to that telephone set by pressing one or two of the buttons on his or her badge. Upon pressing the buttons, the RF burst associated with that command will be received by the telephone set 15, modulated for transmission on the connecting line to the PBX 16. Once received, database 17 will then associate the profile of user A to telephone set 15. Thus, when the user makes use of that telephone set, all features associated in the network with that user will be provided to the user.

By using the location and state information of both the calling user and called users, a number of new services can be developed. For example, when a user does not answer an incoming call, the network will normally route the call to a voice mail after 3 to 4 rings at the user's set. With the locator system of the present invention, if the network does not know the location of the user then there is no need to provide ringing to the calling user before the call forward no answer (CFNA) service is invoked. Instead the call will be forwarded to a voice mail immediately because the network knows that the called user can not be reached. The voice mail storage facility can either be an integral part of switch 16, or an external service (not shown). Some other services that can be implemented are as follows:

Call When Both Home (CWBH):

A call completion feature which allows the calling user to specify that the network set up a call between the calling user and the called user when both users are located at their home location.

As an example, if user A needs to communicate with user B wearing badge 10b, then, other than leaving a voice mail when user B is not available, user A activates the CWBH feature from his home telephone, i.e. telephone 11. When user B returns to his office, he will become automatically registered on the network, since telephone set 15 is his "home location", and a call will be initiated between user A and B.

Call When Both Registered (CWBR):

This service is similar to call when both home, the only difference is the call is set up when both users are registered in the network as opposed to being at their home location.

This, for example, could happen when user A is making use of a temporary office and user B happens to be in the building's main conference room. If user A is initiating the call, the service feature could be enabled by making use of soft keys on the telephone set, pressing a predetermined sequence of buttons on the badge, or other activation feature.

Caller Negotiation:

This feature puts the choice of call termination treatment back into the hands of the calling user. In today's network if the call is call forward no answer (CFNA) to a voice mail machine, the calling user can only leave a message or be rerouted to a live attendant. Caller Negotiation allows the call to be suspended and presents the calling user a choice of what service they would like. If a call forward no answer is about to occur, the user may be presented with the following choices: Voice Mail, Secretary, CWBH, CWBR, and Page.

Call Disruption:

This feature is based on the called user location's proximity information. For example, a single receiver located at a telephone set of a conference room, may receive multiple location signals for different locators in the immediate area. This can be interpreted as a meeting in progress amongst the users carrying the ID badges. The caller calling a specific user in this situation can therefore be informed that "a meeting is in progress", and thus be able to negotiate the call destination. For example, in FIG. 1, if user A is in the office of user B, then the receiver at telephone set 15 will receive multiple location signals. The system can be designed such that the system's response provide the calling party with either the number of people in user B's office, who is present, or whether a visitor, wearing a visitor badge is present. The visitor badge could, of course, be programmed to provide the name of the visiting individual and his company name. This interrupt feature could, for example, be provided only if the calling party is at a higher reporting level than the called party, such as the employee's supervisor.

Autonomous ring tone volume control:

With this feature, the receiver has the ability to detect the signal strength of the RF signal transmitted by the ID badge. A strong signal indicates that the user is in the immediate proximity of the receiver, a weak signal implies that the user is at a distance from the receiver. If this receiver is integrated into a telephone set, it can relay the RF signal strength to the set, thus allowing the telephone to adjust its ringing volume as calls arrive on the set.

Handsfree call by name:

With this feature, one of the buttons on the badge can be programmed to request call origination. For example, if a receiver embedded into a telephone set that has handsfree operations receives an RF signal associated with this button depression and forwards this information to the network, the network can instruct the telephone set to start handsfree operation. At the same time, the network can validate the user associated with the transmitter to grant such service request. Once validated, the network will connect this telephone to a voice recognition server, which can be located either with the database 17 or the PBX 16. The user will announce the name of the intended called party. This voice message will be transmitted through the handsfree unit of the telephone to the voice recognition server. The server will then match the name of the called party provided by the user to one in the name file of the system. Once a match is found, the server will relay the call routing digits to the telephone network, thereby completing the call.

Feature button programming:

This feature allows users to program the buttons on their badges to operate a specific telephone network feature required. Thus, when the user presses the selected button, the network feature will be activated. The programming can be done from any telephone set using interactive displays/voice response systems using soft keys. Once the feature is selected, the user is prompted to select a specific button on the ID badge. As the button is depressed, the associated RF signal will be received by the telephone network and it will be designated as required RF signal for requesting the selected feature.

The programming of the buttons could also be done when the user request a badge from, say, the company's security group. Thus, the user would simply indicate the type of features to be activated, which button sequence to be used and provide his or her associated profile upon requesting a new badge. Accordingly, in use, the network would associate the user's use of the buttons with a service listed in the user's profile. Thus,- the depression of a button on the badge of user A and B both provide the same RF burst. However, the combination of that RF burst with user A's ID code results in a different feature than the RF burst with user B's ID code.

What is claimed is:

1. A system for providing a personal communication and locator service within a telephone network as a subscriber moves along the network from a first receiver device associated with his home telephone set to a second receiver device associated with a visited telephone set, comprising:

storing means, at database means, for storing a list of subscriber profiles indicative of the identity of the subscriber and network services available to that subscriber at his home telephone set;

transmitter means adapted to be carried by a subscriber, and able to transmit a predetermined RF signal;

input means at said transmitter means to allow said subscriber to modify said predetermined RF signal to initiate a predetermined network service;

multiple receivers means adapted to be connected and distributed across said telephone network and able to receive said predetermined and modified RF signals indicative of a specific network service requested by said user;

signal modulation means at said multiple receivers means for modulating said predetermined and modified RF signals into a modulated signal;

means for sending, along a telephone line connected to said multiple receivers means, said modulated RF signal to a switch connected to said network; and means for registering said subscriber service profile against said visited telephone set associated with said second receiver device when said subscriber activates said input means, such that the subscriber's network services and telephony features available from his home telephone set can be enabled at said visited telephone set.

2. A system as defined in claim 1, wherein said transmitter means is embedded in an ID badge carried by said subscriber and said input means comprises programmable button means to allow said user to modify said predetermined RF signal.

3. A system as defined in claim 1, wherein said transmitter means is further comprised of:

microcontroller means connected to said programmable button means;

RF oscillator and modulator means connected to said microcontroller means;

antenna means for transmitting an RF signal generated by said RF oscillator and modulator means; and means for providing power to said microcontroller, RF oscillator and modulator means.

4. A system as defined in claim 3, wherein said antenna means provides an omnidirectional radiation pattern and spatial diversity.

5. A system as defined in claim 4, wherein said antenna means is generally cross-shaped.

6. A system as defined in claim 4, wherein said antenna means comprises a spirally etched metallic film extending around the perimeter of the badge.

7. A system as defined in claim 1, wherein said receiver means comprises:

radio transceiver means;

antenna means connected to said radio transceiver means for capturing said RF signal from said transmitter means;

microcontroller means connected to said radio transceiver means and telephone interface means, said telephone interface means allowing said radio transceiver means to access said telephone network;

power supply means connected to said telephone interface means for obtaining power from a telephone line connected to said receiver means; and input/output means for connecting to accessories required for providing said locator and access control service.

8. A system as defined in claim 7, wherein said receiver means forms an integral part of a telephone set connected to said network.

9. A system as defined in claim 7, wherein said receiver means is part of a stand-alone unit connected to said telephone network via a telephone line.

10. A system as defined in claim 9, wherein said receiver means is positioned near an access control point to monitor, allow or deny access to predetermined ID badge users.

11. A system as defined in claim 10, wherein said receiver means is positioned at a doorway for controlling access through said doorway.

12. A system as defined in claim 11, wherein said input/output means is connected to a door latch of said doorway.

13. A system as defined in claim 10, wherein said receiver means is positioned at a building entrance pedestal for controlling access through said building.

14. A system as defined in claim 13, wherein said input/output means is connected to photoelectric sensors and an alarm system of said pedestal.

15. A system as defined in claim 10, wherein said receiver means is positioned at office partitions.

16. A system as defined in claim 1, wherein said RF signal comprises an RF burst of data send at random intervals.

17. A system as defined in claim 16, wherein said RF burst comprises a series of preamble bits followed by a header, badge ID code, sequence number and CRC bits.

18. A method of operating a system for providing a personal communication and locator service, wherein transmitting devices, which are carried by a subscriber of the service, transmit at periodic intervals RF signals indicative of the identity of the subscriber and are provided with means for modifying said RF signal, multiple receiver devices, which are connected and distributed across a telephone network are adapted to receive the RF signals as the subscriber moves along the network from a first receiver device associated with his home telephone set to a second receiver device associated with a visited telephone set, comprising the steps of:

storing, at database means, a list of subscriber profiles indicative of the identity of the subscriber and network services available to that subscriber at his home telephone set;

transmitting said RF signal, as a subscriber moves towards said second receiver device associated with said visited telephone set;

modulating said transmitted RF signal to obtain a modulated RF signal;

sending, along a telephone line connected-to said second receiver device, said modulated RF signal to switching means connected to said network;

accessing said database means when said switching means receives said modulated signal;

searching said database means to find a profile associated with said modulated signal, to identify the subscriber and service profile; and registering said subscriber service profile against said visited telephone set associated with said second receiver device when said subscriber activates said modifying means, such that the subscriber's network services and telephony features available from his home telephone set can be enabled at said visited telephone set.

19. A method as defined in claim 18, wherein a call directed to the home telephone set of said subscriber will automatically be forwarded to said visited telephone set when said subscriber has registered his service profile thereto.

20. A method as defined in claim 19, wherein a call between a first subscriber and a second subscriber can be completed when both subscribers have registered to nearby receiving devices.

21. A method as defined in claim 19, wherein an incoming call directed to a subscriber located at a receiving device which is receiving multiple RF signals is forwarded to a voice mail device.

* * * * *